UNITED STATES PATENT OFFICE.

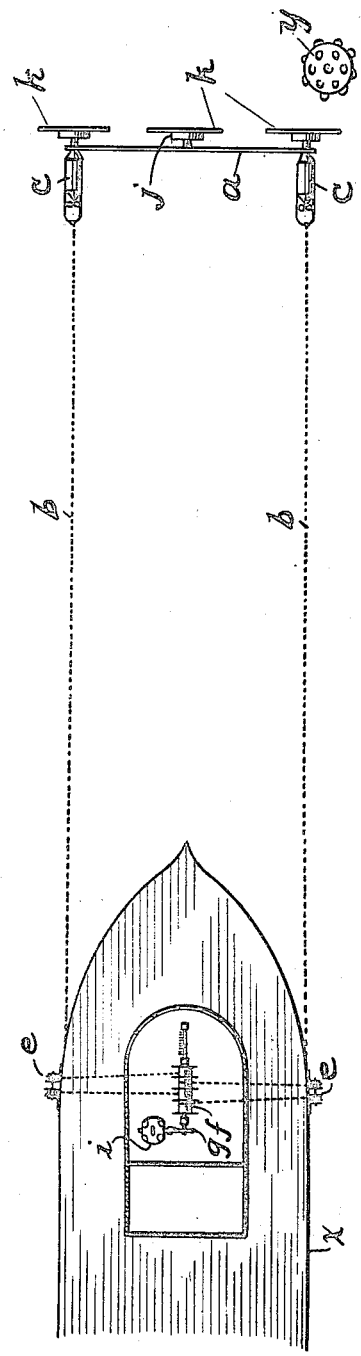
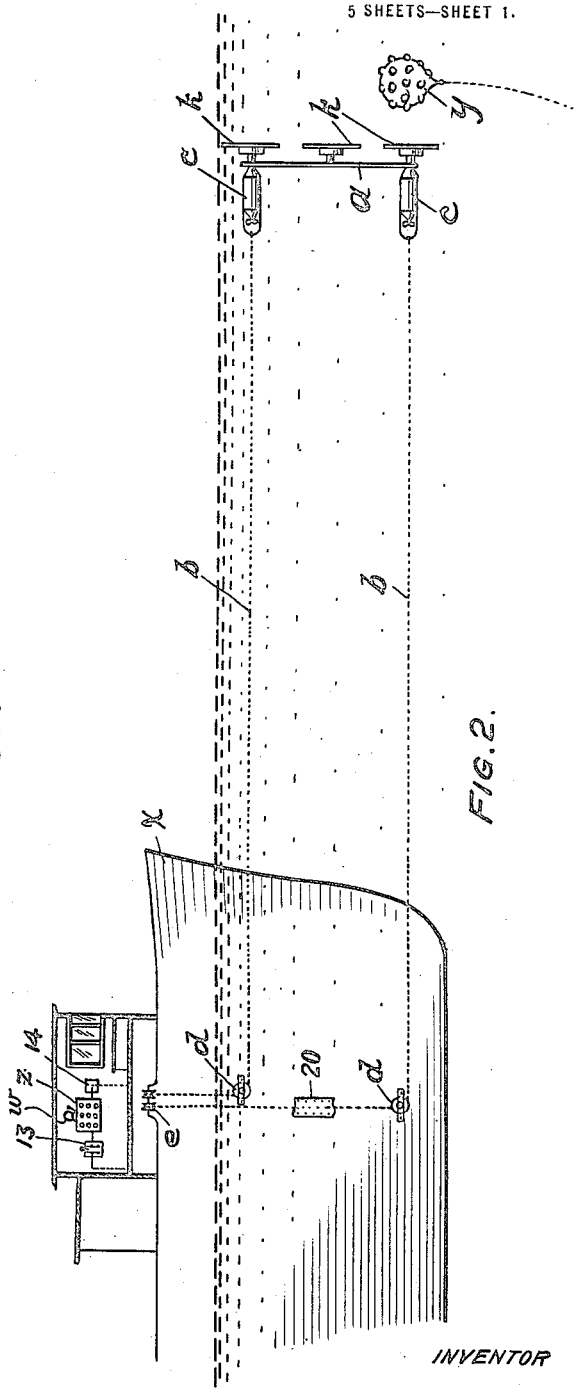

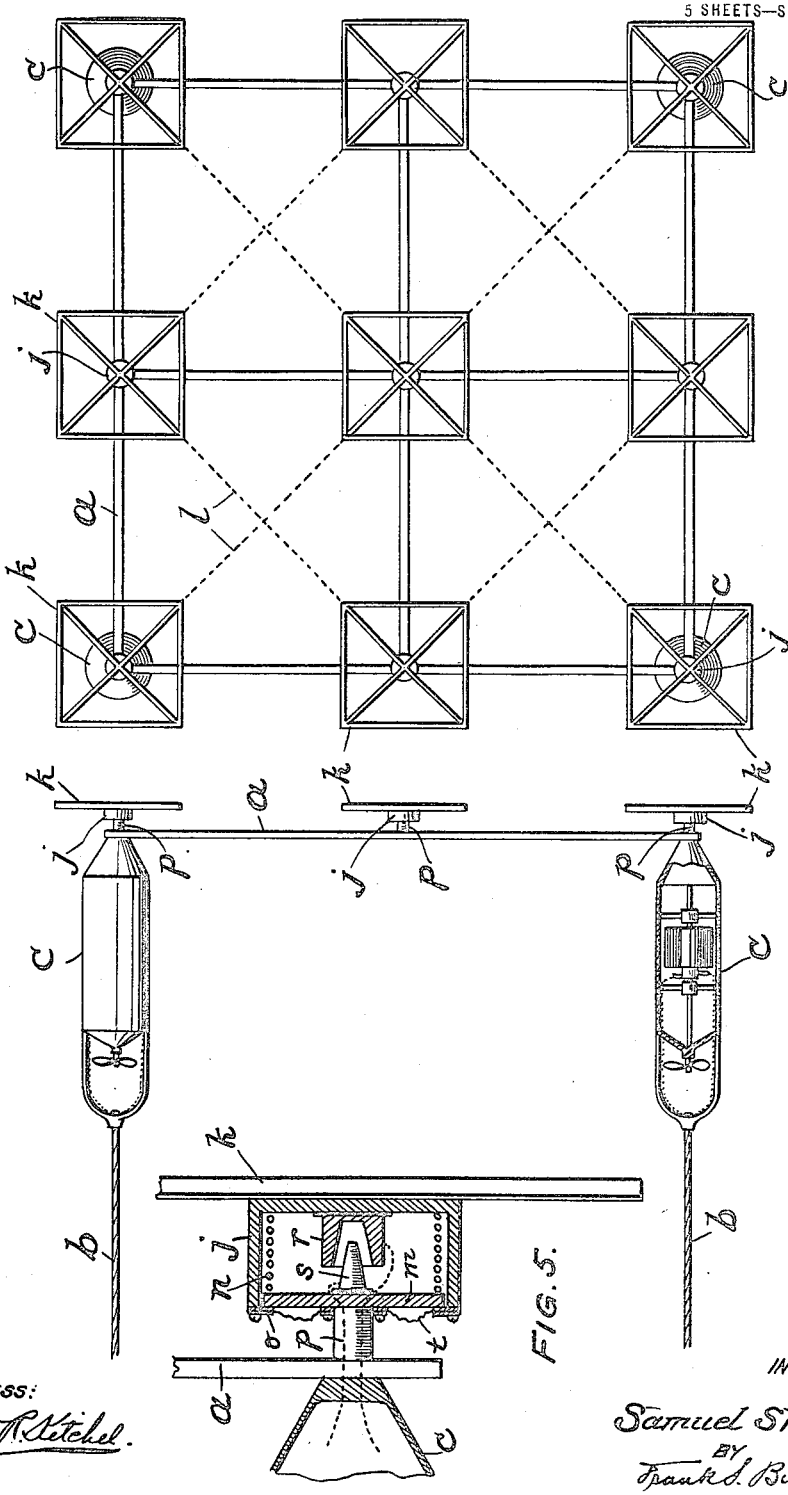

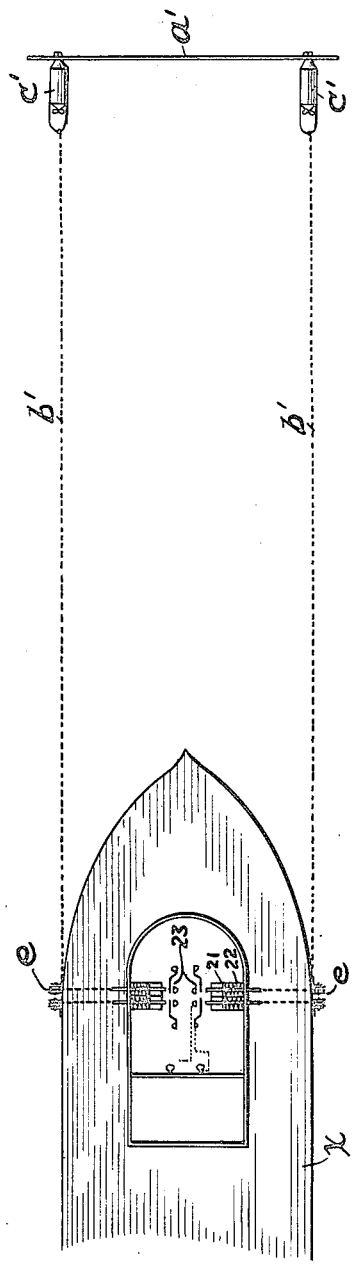
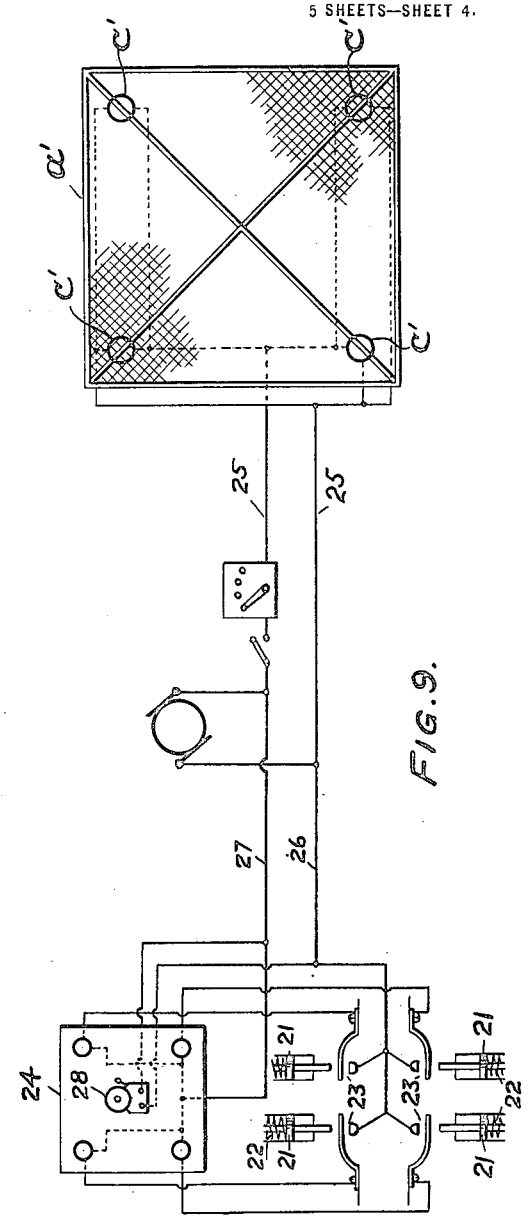

SAMUEL SHELLY, OF PHILADELPHIA, PENNSYLVANIA, ASSIGNOR OF ONE-HALF TO SAMUEL MOYERMAN, OF PHILADELPHIA, PENNSYLVANIA.

MEANS FOR PROTECTING SHIPS FROM COLLISIONS, ETC.

1,402,258.   Specification of Letters Patent.   Patented Jan. 3, 1922.

Application filed October 18, 1918. Serial No. 258,691.

*To all whom it may concern:*

Be it known that I, SAMUEL SHELLY, a citizen of the United States, residing at Philadelphia, county of Philadelphia, and State of Pennsylvania, have invented a new and useful Improvement in Means for Protecting Ships from Collisions, Etc., of which the following is a full, clear, and exact description, reference being had to the accompanying drawings, which form a part of this specification.

My invention relates to the protection of ships at sea from collision or, more particularly, from running into any submerged obstruction which may be in the nature of rocks, shoals, submarines, or mines intended for the ship's destruction.

The object of my invention is to give warning to the crew of a vessel, sailing apparently safely in an unobstructed ocean lane, of the presence of some dangerous obstruction directly in its path. A further object is to produce a warning of such a character as to indicate, when the obstruction is a comparatively small body, as a floating mine, which side of the ship would be struck thereby if the ship is kept directly on its course, so that the pilot may know which side to steer in order to avoid the obstruction.

The apparatus embodying my invention in its preferred form consists of a light open frame-work propelled at a safe distance ahead of the ship, entirely submerged, and covering in area practically the largest submerged cross-section of the ship. Thus, any floating or stationary submerged object which would strike the hull of the vessel in its course would first come in contact with the forward guard frame. This contact is arranged, by suitable apparatus, to operate an indicator in the pilot house of the vessel, which first calls the attention of the pilot to the fact that his guard has fouled an obstruction and then further gives him a visual indication which portion of the guard has been struck. If on the port side, he may steer to starboard and vice versa, and if on the bottom he may suspect the presence of a shoal and have an opportunity to stop and reverse his vessel.

My invention does not comprise cumbersome or expensive apparatus; it can be readily connected with existing vessels, and when so connected is capable of being drawn in and hoisted out of use upon the bow when it is not desired to have such a guard, as in nosing a vessel into its dock.

With this preliminary exposition of the nature and objects of my invention, I will now proceed to a detailed description of an apparatus embodying the same, which may thus be fully understood and appreciated, in connection with the accompanying drawings, in which—

Fig. 1 is a plan view of the bow of a vessel with my invention attached thereto.

Fig. 2 is a side view of same.

Fig. 3 is a detail face view of a guard frame such as is indicated in Figures 1 and 2.

Fig. 4 is a side view of said guard frame and its propellers partly broken away.

Fig. 5 is an enlarged detail section of one of the contact devices carried by the guard frame.

Fig. 8 is a plan view of the bow of a ship with a modified form of my invention attached thereto.

Fig. 9 shows a wiring diagram in connection with the guard frame of the modified form of my invention.

Figure 6:
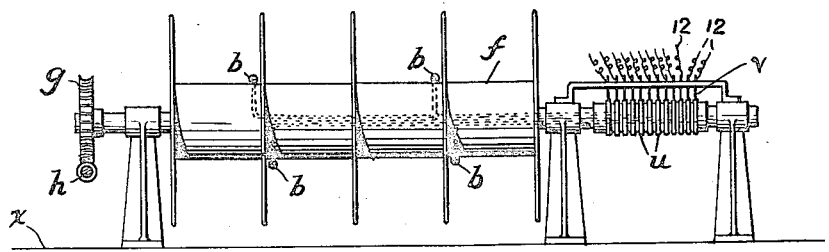
Fig. 6 is a detail view of the drum for the cables connected with the guard frame, and the electric connections therefor.

Referring to Figures 1 to 7 inclusive: *a* represents a vessel moving forward in the water and *y* a possible obstruction in its path, as a floating mine.

A guard frame *a* is carried a safe distance ahead of the ship and connected therewith by cables *b*. A safe distance may be anywhere from 200 to 1000 feet, dependent upon the size and usual speed of the vessel. The guard frame is carried and propelled forward by four motor-propellers *c* driven by motors carried in housings rigidly attached to the four corners of frame *a*. Buoyancy for supporting the motors and frame and parts connected therewith is provided by air spaces in the motor housings, which are made sufficient to maintain the guard frame at the proper degree of submergence, the lower housings being less buoyant than the upper tending to make the frame assume an upright position in the water, the housings being of general cigar shape do not present any material added obstruction to the passage of the frame *a* through the water.

The motor housings *c* are provided with bales for connecting with the cables *b*. These four cables extend practically horizontally through the water to the hull of the ship, where they extend under vertical pulleys *d* and are thence led upward along the sides above the water level, where they extend over pulleys *e* and are led along or just under the deck to a centrally arranged drum *f* to which their ends are attached.

Drum *f* is preferably formed in four sections for the separate cables, and the two cables from one side of the ship are attached to their sections at points (say) on top of the drum, the cables from the other side being attached to their sections at points on the bottom of the drum or diametrally opposite the points where the cables from the opposite side attach. In this way, when the drum is turned, all four cables are either wound up or paid out, as the case may be.

Drum *f* is fixed to a shaft which carries at one end a worm-wheel *g* meshing with a worm *h*, which may be operated by an electric motor *i*. By this means, sufficient speed and power are obtained and at the same time the worm acts as a lock and prevents the drum from being unwound by the pull of the cables.

The motor propellers *c* are arranged to run at a higher speed than the vessel *x*, so that the frame *a* will always be propelled in advance of the ship and the cables *b* kept taut. The cables, in connection with the differential buoyancy between the upper and lower motor housings, maintain the guard frame in upright position against any tendency to lie flat.

The current for the propellers is supplied by wires leading out through the cables, as will hereinafter be more specifically described.

The guard frame is provided at its corners and intermediate thereof with a plurality of electric contact boxes *j*, each box carrying a light frame *k* of moderate extent, so that the frames *k* all lie in the same plane and form, in face view, as shown in Figure 3, more or less of a screen. By interconnecting corners of these frames by ropes or wires *l*, as shown, the screen-like effect is enhanced.

Each contact box *j* (see Figure 5) has a slidable head *m* normally held out by a spring *n* against a flange *o* on the box. The head *m* is rigidly carried on a post *p* projecting forwardly from the main frame *a*. Interiorly the contact box is provided with two centrally disposed insulated contacts *r* and *s*, one on the bottom and the other on the head, which are preferably made so that one partly envelops the other, as shown. By this means, when an obstruction in the path of the moving screen strikes one of the frames *k*, the box *j* connected with it is forced backward upon the sliding head on compressing spring *n*. If frame *k* is struck on one of its sides, box *j* will be pushed back on one side and contacts *r* and *s* will be brought together on their sides. Head *m* has a loose enough fit in the box to admit this uneven yielding.

A bellows-like diaphragm *t* is provided for keeping the contact box water-tight, thus protecting the contacts, spring, wires, etc., from the deleterious effects of the salt water.

When an object is struck by any portion of the forwardly advancing guard screen, contact is made between *r* and *s* in at least one of the contact boxes. Wires lead from these contacts back through post *p*, along frame *a* to one of its corners, thence into and through the motor propeller case at that corner, and along or through the cables connecting with the ship. Where the cables are attached to drum *f*, the wires carried by the cables may enter the drum and pass through the center of its shaft out to one end, where they can be connected in any suitable manner, as by the brass rings *u* and brushes *v* shown, with wires leading to the indicator.

The indicator consists, first, of a bell *w* and, secondly, of an indicator board *z* of electric lamps equal in number and arranged similarly to the frames and contact boxes on the forward screen.

Figure 7:
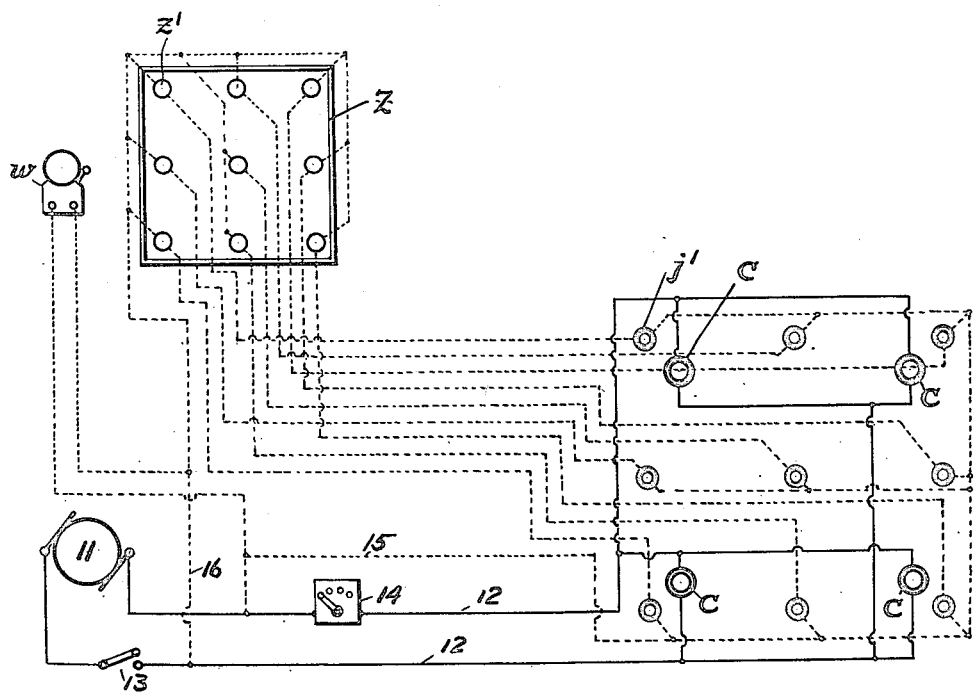
Fig. 7 is a wiring diagram of the electric connections for one form of my invention.

The wiring for the motor propellers and the contact boxes may be arranged as shown in Figure 7. From a generator 11 a circuit 12, shown in full lines, includes the four motor propellers in parallel, and embraces a cut-out switch 13 and a rheostat 14 for controlling the speed. From both sides of this circuit, wires 15, 16 lead off in a shunt circuit to the contact boxes and the indicator lamps, which are individually connected as shown, so that the actuation of one of the contact boxes, as $j^1$, to close its contact, will energize lamp $z^1$ on the indicator board.

From lines 15, 16, a shunt circuit 17 leads to bell *w*, so that when any one of the contact boxes is operated, the bell will ring and call the attention of the pilot to the indicator. He will know, by the location of the lighted lamp on the board, just which contact box on the guard frame has been struck and can govern his actions accordingly to steer in a counter direction and avoid the obstruction.

The motor propellers need not be of any great strength, but they should be powerful enough to support the cables in a fairly taut condition and to propel the guard frame through the water at a rate considerably in excess of the maximum speed of the ship.

When the ship makes a turn or changes its direction in any degree, the guard frame follows ahead of it and maintains its position in advance for the following reason. In making a turn to one side, say to port, the cable on the port side will remain taut but the starboard cable will tend to slack. The speed of the motor propellers, however, being greater than that of the ship, the slack side forges ahead until the guard frame assumes its original position directly in advance of the ship. As this is done immediately and continuously, the guard frame remains practically in the position desired at all times. In a protracted turn there is more or less lag dependent on the speed of the ship, but the guard frame soon rights itself and continues to act as a detector for rocks, mines or other obstructions in its path.

The electric wires may be wound around the cables and the whole coated with shellac, or otherwise covered, to protect the wires from the water. Where the cables lead up the sides of the ship from pulleys $d$ to pulleys $e$, they may be protected by bent plates 20 riveted to the sides and forming channels for the cables beneath them; or the ship's sides may be formed with vertical grooveways for the reception of the cables at these points.

In Figures 8 and 9 I have shown a slightly modified form of my invention, differing somewhat in construction, but carrying out the same ideas. The light rigid guard frame $a'$ carries motor propeller $c'$ near its corners, and cables $b'$ connect these with the ship by way of pulleys, as in the first described construction. In this case, however, the ends of the cables are connected with plungers 21, and the pull of the motor propellers is taken up by springs 22 on each plunger. When a corner of the guard screen strikes an obstacle it is retarded, slackening its cable to some extent. This allows its spring 22 to push out its plunger 21, the other end of which is arranged to close a contact 23 and ring a bell and light a lamp on an indicator board 24, showing the pilot not only that his guard frame has struck an obstacle, but which corner has struck, so that he may steer out of its way.

In this case the wiring is very much simpler than the other, as shown in Figure 9. The main circuit 25 is led from the generator by way of the cables to the guard frame, where it makes connections with the four motor propellers in parallel. This circuit embraces a cut-out switch and controller as before. A shunt circuit is taken from both sides of circuit 25, by leads 26, 27, to the plunger switches and the bell and lights. The wiring is such that the deflection of any corner of the guard frame will allow its plunger 21 to close its contact 23 and ring the bell 28. Also, the lamp on the indicator board 24 will light in the corner corresponding to the corner of the guard frame which is deflected, signifying to the pilot that he is approaching an obstacle and on which side.

Figure 10:
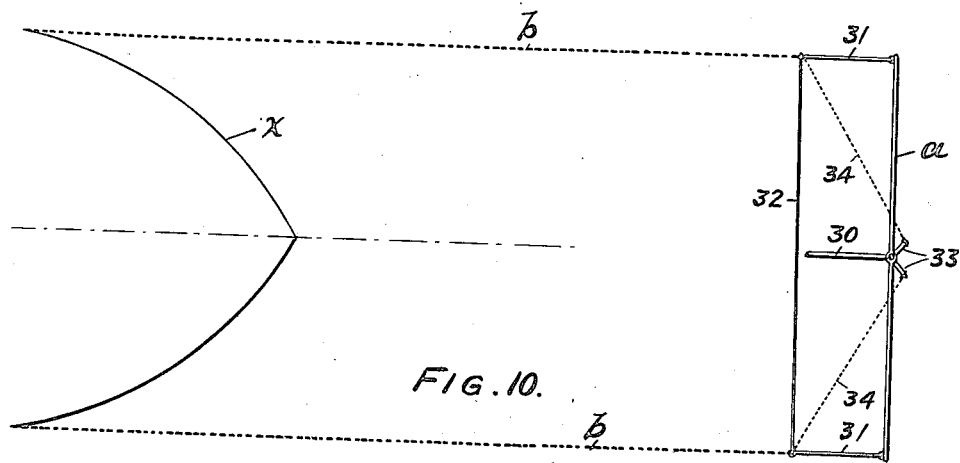
Figs. 10 and 11 are diagrammatic views showing different positions of a form of guard frame provided with self-steering means.
Figure 11:
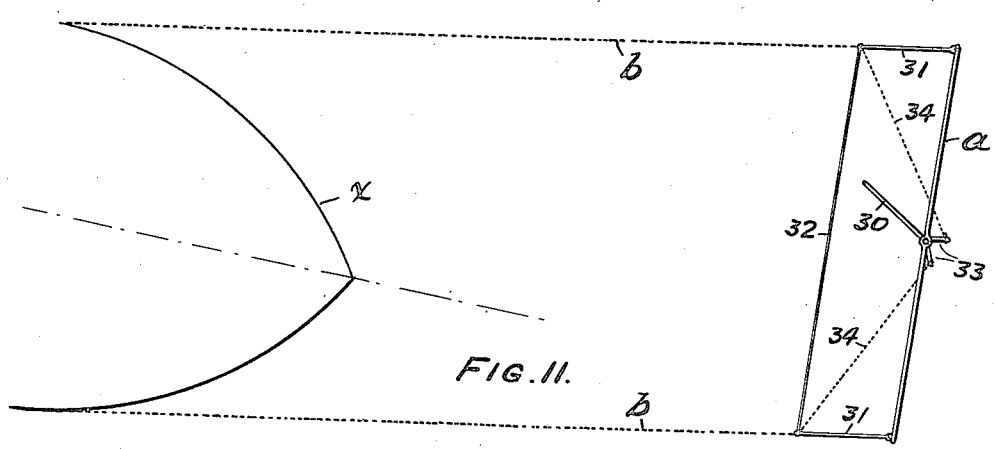
Figure 12:
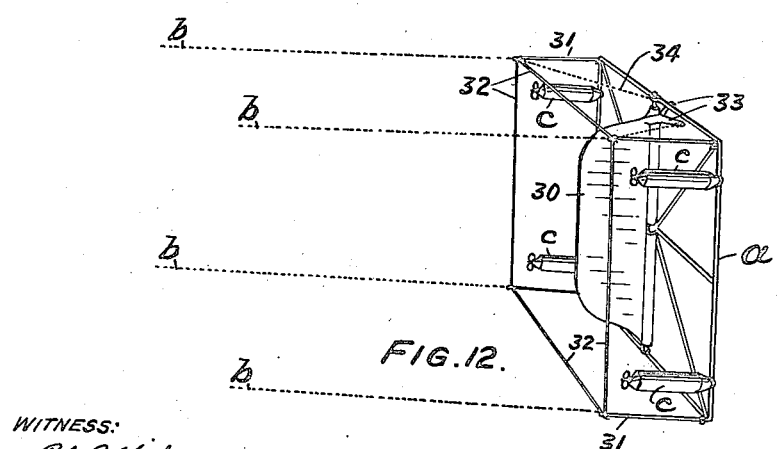
Fig. 12 is a perspective view of this form of guard frame.

In order to insure quicker action in turning to either side from direct forward motion, a rudder may be used on the guard frame, as indicated in Figs. 10, 11, 12. In this arrangement a rudder 30 is pivoted on a vertical axis in the middle of the guard frame $a$, and is operated in the following manner.

The cables $b$ leading to the ship are not in this case, as previously described, connected with the motor propellers $c$, but with the corners of a light articulated framework connected with guard frame $a$. The framework comprises links 31 flexibly connected with the corners of frame $a$, the outer ends of the links being connected by rods 32, forming altogether an articulated parallelepipedon, to the rear corners of which the cables $b$ are attached. The motor propellers $c$ are attached to the side members of guard frame $a$ just inside of links 31 so as not to interfere with them. The rudder 30 has arms 33 projecting forwardly at an angle to either side, and these arms are connected by links or ties 34 with the outer ends of links 31 in the same horizontal plane above or below or both. As shown in Figure 12, they connect with the upper links 31.

In direct forward motion, shown in Figure 10, the rudder 30 is held by the equal ties 34 in central alinement with the ship's path. When the ship turns, however, as illustrated in Figure 11, the cables $b$ will drag the light framework into a skewed position with respect to guard frame $a$ which is being continuously driven ahead by its motor propellers. This skewing of the light framework pulls the rudder around by one or other of the ties 34 into an angular position which steers the motor propelled guard frame in the direction the ship is turning.

In this way, the guard frame is automatically steered in the same direction the ship is turning, and as it straightens out on its new track the rudder automatically resumes its central trailing position, presenting no opposing surface to the passage of the guard frame through the water. The length of arms 33 may be adjusted to turn the rudder to the necessary angle, which may be much greater then the angle of the ship's rudder, in order to insure quick turning of the guard frame in the new direction. The guard frame, though as shown is merely a rectangular frame, may of course be of either of the forms previously described. The controlling electric wires connecting with the ship and passing out by the cables in this case pass along links 31 to the guard frame, whence they are led as desired to the motor propellers.

Having now fully described my invention what I claim and desire to protect by Letters Patent is:

1. In means for protecting ships against collisions, etc., the combination with a ship, of a submerged guard contrivance arranged transversely of the ship and approximating in area the transverse dimensions of the submerged hull of the ship, spaced parallel cables connecting the top and bottom of the guard at both sides to the sides of the ship, and a motor propeller adapted to propel said guard contrivance in advance of the ship.

2. In means for protecting ships against collisions, etc., the combination with a ship, of a guard contrivance, a motor propeller tending to propel said guard contrivance in advance of the ship at a rate of speed exceeding that of the ship, and four flexible connections between the sides of the ship and the guard contrivance normally maintaining the latter at a substantially fixed distance in advance of the ship, the connections on one side being spaced from the other a distance equal to the beam of the ship.

3. In means for protecting ships against collisions, etc., the combination with a ship, of a guard frame extending transversely of the ship, a motor propeller tending to propel said guard frame in advance of the ship at a rate of speed exceeding that of the ship, and a plurality of separated flexible connections between the guard frame and the sides of the ship adapted to tie the guard frame to the ship and restore and retain it in its transverse position after a change in direction of the ship.

4. Means for protecting ships against collisions, etc., comprising a guard frame in advance of a ship to be protected, a buoyancy chamber connected to each side of the guard frame arranged to support the guard frame submerged at a predetermined depth and in an upright position, a motor in each chamber having a shaft extending through the wall of the chamber, a propeller on each shaft, and a flexible connection between each chamber and the side of the ship, said connections between the ship and the chambers being spaced a sufficient distance apart to cause the frame to be moved laterally by the propellers on one side when the connection at that side has been slackened by the turning of the ship to tend to move the frame into the path ahead of the ship.

5. Means for protecting ships against collisions, etc., comprising a guard frame in advance of a ship to be protected adapted for substantial submergence, four motor propellers adapted for submergence at different depths and spaced apart transversely and connected with said frame to maintain it in a vertical position, and a flexible trailing motive power transmission connection between each motor propeller and the ship, two of said connections being connected to one side of the ship while the other two are connected to the other side thereof, said connections being substantially parallel to each other.

6. In means for protecting ships against collisions, etc., the combination with a ship, of a submerged guard contrivance arranged transversely of the ship and approximating in area the transverse area of the submerged portion of the hull of the ship, means carried by said contrivance to maintain it in equilibrium at a predetermined degree of submergence, means connected to both sides of the guard to drive it through the water in advance of said ship, and a plurality of flexible leashes connected to the hull of the ship and the guard, said leashes being spaced a sufficient distance apart to cause the pull of the guard driving means to maintain the guard vertical and in a plane transverse to the ship.

7. In means for protecting ships from collisions, etc., the combination with a ship, of a guard contrivance, motor propellers tending to propel said guard contrivance in advance of the ship, flexible and approximately parallel connections between the ship and the guard contrivance normally maintained taut by the action of the motor propellers, a rudder on the guard contrivance, and means controlled by the tension of the flexible connections in the turning of the ship to turn said rudder to steer the guard contrivance in the direction the ship is turning.

8. In means for protecting ships against collisions, etc., the combination with a ship, of a submerged guard contrivance arranged transversely of the ship and approximating in area the transverse area of the submerged portion of the hull of the ship, comprising a frame, contact points within the periphery of said frame and flexible connections between said points, forming a netting, buoys secured to said frame adapted to maintain said contrivance in equilibrium at a predetermined degree of submergence, means to propel said contrivance in advance of the ship, and parallel cables connecting said contrivance to the ship to maintain the contrivance in the ship's course.

9. In means for protecting ships against collisions, etc., the combination with a ship, of a submerged guard contrivance arranged transversely of the ship and approximating in area the transverse area of the submerged portion of the hull of the ship, comprising a frame, contact points within the periphery of said frame, means adapted to support said frame in equilibrium at a predetermined degree of submergence and propel it in advance of the ship, a source of power on the ship, indicators on the ship, and parallel flexible connections between said contrivance and ship adapted to locate and maintain said contrivance in the path of the ship by the unequal tension thereof and to support power transmission means leading from said source of power to said contact points and to said indicators.

10. In means for protecting ships against collisions, etc., the combination with a ship, of a submerged guard contrivance arranged transversely of the ship and approximating in area the transverse area of the submerged portion of the hull of the ship, means carried by said contrivance to maintain it in equilibrium at a predetermined degree of submergence, means connected to both sides of the guard to drive it through the water in advance of the said ship, and parallel flexible connections between the ship and the sides and top and bottom of said contrivance adapted to hold said contrivance in leash and maintain it in a plane substantially parallel to a plane extending transversely of said ship, in the various evolutions of said ship when cruising.

11. In a ship protecting device, a guard in advance of the ship, means independent of the ship to propel the guard forwardly, and connections between the guard and the ship, said connections including a plurality of cables of normally fixed lengths and sufficiently spaced apart in different horizontal and vertical planes so as to be maintained taut by the pull of the guard and thereby maintain the guard in the ship's course.

12. In a ship protecting device, a guard in advance of the ship, means tending to propel the guard at a speed in excess of the speed of the ship, leash lines connected to the guard and ship in different horizontal and vertical planes and of the proper relative lengths to exert an equal pull on the ship when the guard is in a plane parallel to a plane extending transversely through the ship, and means for simultaneously winding up all of the cables at the same rate.

In testimony of which invention, I have hereunto set my hand, at Philadelphia, Pa., on this 14th day of October, 1918.

SAMUEL SHELLY.